(12) United States Patent
Shieh

(10) Patent No.: US 10,173,592 B1
(45) Date of Patent: Jan. 8, 2019

(54) SAFE OPENING SYSTEM FOR AUTOMOBILE DOOR

(71) Applicant: Ming-Long Shieh, Huwei Township, Yunlin County (TW)

(72) Inventor: Ming-Long Shieh, Huwei Township, Yunlin County (TW)

( * ) Notice: Subject to any disclaimer, the term of this patent is extended or adjusted under 35 U.S.C. 154(b) by 0 days.

(21) Appl. No.: 15/990,872

(22) Filed: May 29, 2018

(51) Int. Cl.
 *B60Q 1/00* (2006.01)
 *B60Q 9/00* (2006.01)
 *B60R 21/01* (2006.01)
 *E05F 15/40* (2015.01)

(52) U.S. Cl.
 CPC .............. *B60Q 9/008* (2013.01); *B60R 21/01* (2013.01); *E05F 15/40* (2015.01)

(58) Field of Classification Search
 CPC .......... B60Q 9/008; B60Q 1/32; B60Q 1/525; B60R 21/0132; B60R 16/02; B60R 21/0134
 See application file for complete search history.

(56) References Cited

U.S. PATENT DOCUMENTS

| | | | | |
|---|---|---|---|---|
| 4,972,173 A * | 11/1990 | Raciti | ................ | B60Q 1/323 340/468 |
| 5,828,299 A * | 10/1998 | Chen | ................ | B60Q 1/0076 340/468 |
| 6,252,500 B1 * | 6/2001 | Chueh | ................ | B60Q 1/323 340/438 |
| 8,963,701 B2 * | 2/2015 | Rodriguez Barros | . | B60Q 1/323 340/438 |
| 9,821,743 B2 * | 11/2017 | Zhang | ................ | B60Q 1/2692 |
| 9,840,190 B2 * | 12/2017 | Brady | ................ | B60Q 1/323 |
| 2015/0002288 A1 * | 1/2015 | Lee | ................ | B60Q 1/46 340/471 |

\* cited by examiner

*Primary Examiner* — Toan N Pham

(74) *Attorney, Agent, or Firm* — Alan D. Kamrath; Kamrath IP Lawfirm, P.A.

(57) ABSTRACT

A safe opening system is mounted on an automobile which contains a body, at least one automobile door, and the driving device. The body includes at least one peripheral frame, each of which has a locker with a fixing groove. Each automobile door includes a front fringe and a rear fringe which has an accommodation chamber, wherein the decoration plate has a door bar and an orifice. The driving device includes an actuation sheet and a spring, wherein the actuation sheet has a hook, a connection stem perpendicular to the actuation sheet, and a rotary shaft. The spring is fitted on the rotary shaft, and the driving device is accommodated in the accommodation chamber. The connection stem is inserted into each automobile door and a distal end of the connection stem is inserted through and partially extends out of the orifice.

2 Claims, 8 Drawing Sheets

SAFE OPENING SYSTEM FOR AUTOMOBILE DOOR

BACKGROUND OF THE INVENTION

Field of the Invention

The present invention relates to an automobile structure, and more particularly to a safe opening system which is mounted on an automobile and opens each automobile door of the automobile in two operation steps.

Description of the Prior Art

A driver or passenger suddenly opens each automobile door to get out the automobile without noticing whether there are automobiles/motorcycles/bicycles/passengers behind the each automobile door, thus causing collision accident often. This is because the driver or passenger opens each automobile door in a sole operation step or he/she does not turn and look back so as to confirm whether the automobiles/motorcycles/bicycles/passengers come from behind of each automobile door.

To overcome such a problem, an opening device operated in two operation step has been developed. For example, as opening each automobile door, the opening device is started to send a control signal, and the control signal is received by an actuator so as to turn on each automobile door in a small distance. Then, a delay unit of a control module interrupts the control signal after the control signal is outputted for a period of predetermined time so that the actuator release a stop member to open each automobile door completely. However, the opening device has a complicated structure and electronic parts, thus having high manufacture cost. In case the automobile break down or out of power of battery, thus supplying the power to the safe opening system is failed, so each automobile door cannot be opened. When any one of the electronic parts is broken, each automobile door cannot be opened as well.

After getting out of the automobile, an engine of the automobile is powered off and the driver/the passenger opens each automobile door, but each automobile door cannot be opened after powering off.

The present invention has arisen to mitigate and/or obviate the afore-described disadvantages.

SUMMARY OF THE INVENTION

The primary objective of the present invention is to provide a safe opening system by which a driver/passenger has to turn close to each automobile door so as to pull/press a distal end of a connection stem, and the connection stem drives an actuation plate so that a rotary shaft rotates to actuate a hook to move downward/upward, and each automobile door of a body is opened completely in two operation steps.

Secondary objective of the present invention is to provide a safe opening system by which the driver/passenger has to turn close to each automobile door so as to upward pull/downward press the distal end of the connection stem, hence he/she notices whether there are automobiles/motorcycles/bicycles/passengers behind each automobile door.

Third objective of the present invention is to provide a safe opening system which is operated mechanically and does not contain any electronic parts so as to reduce the failure rate, and in case the automobile break down, out of power of battery or is turned off, supplying the power to the safe opening system is not required, and the driving device operates smoothly in the two operation steps.

Further objective of the present invention is to provide a safe opening system which is operated mechanically and is simplified so as to reduce the fabrication and maintenance costs.

Another objective of the present invention is to provide a safe opening system which is operated mechanically and is simplified so as to reduce the failure rate.

To achieve above-mentioned objective, a safe opening system provided by the present invention is mounted on an automobile, and the automobile contains: a body, at least one automobile door, and the driving device.

The body includes at least one peripheral frame, each of the at least one peripheral frame has a locker fixed on each peripheral frame, and the locker has a fixing groove formed on the locker.

Each of the at least one automobile door includes a front fringe and a rear fringe opposite to the front fringe and facing a decoration plate of the body, and the rear fringe has an accommodation chamber in which a slot and a locking tongue are arranged, wherein the decoration plate has a door bar disposed thereon and has an orifice defined adjacent to the rear fringe.

The driving device includes an actuation sheet and a spring, the actuation sheet has a hook extending from a flat surface thereof, a connection stem perpendicular to the actuation sheet, and a rotary shaft. The spring is fitted on the rotary shaft, and the driving device is accommodated in the accommodation chamber, the actuation plate is housed in the slot of each automobile door. The connection stem is inserted into each automobile door and a distal end of the connection stem is inserted through and partially extends out of the orifice.

DETAILED DESCRIPTION OF THE PREFERRED EMBODIMENTS

The present invention will be clearer from the following description when viewed together with the accompanying drawings, which show, for purpose of illustrations only, a preferred embodiment in accordance with the present invention.

Figure 1:
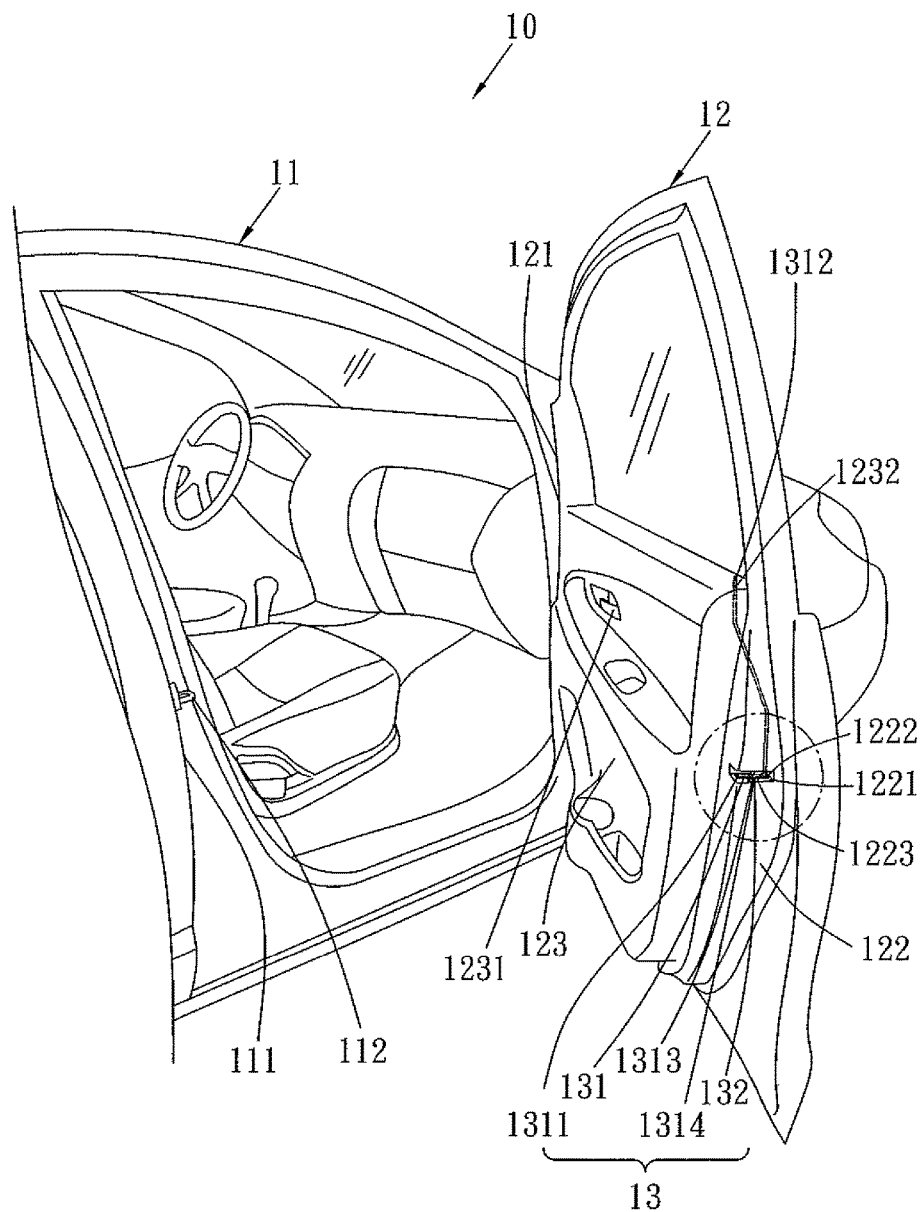
FIG. 1 is a perspective view showing the assembly of a safe opening system according to a preferred embodiment of the present invention.
Figure 2:
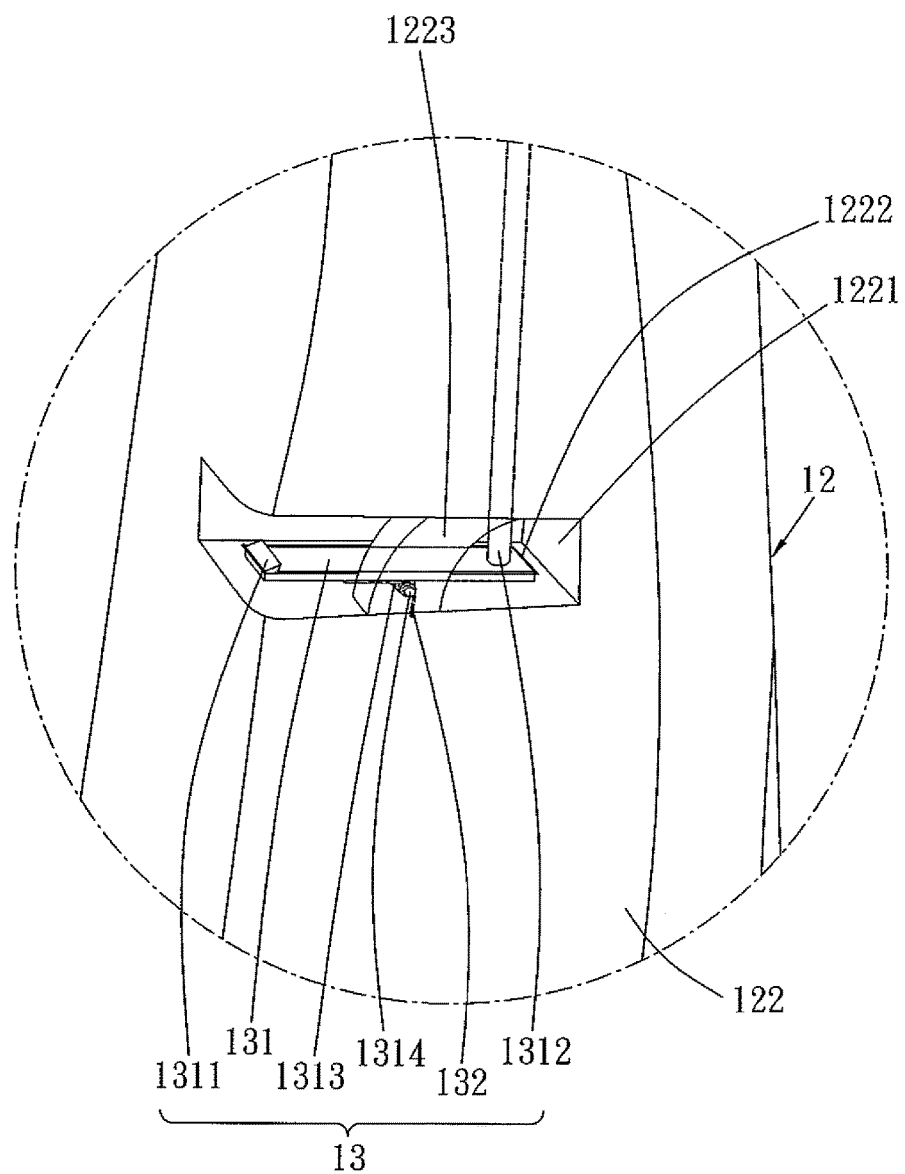
FIG. 2 is an amplified perspective view of a part of FIG. 1.
Figure 3:
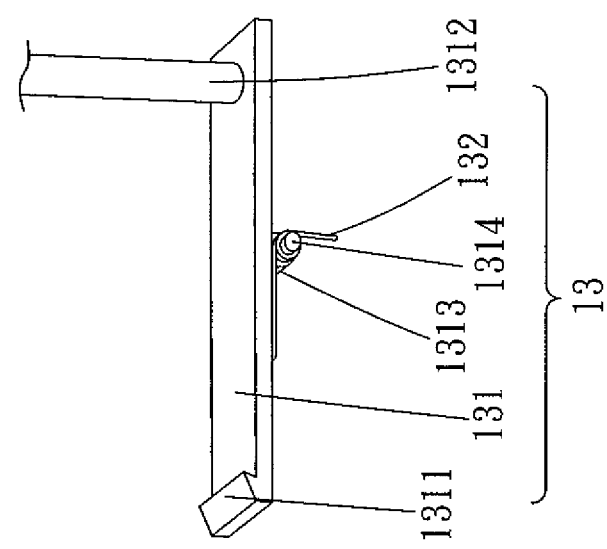
FIG. 3 is a perspective view showing the exploded components of a part of the safe opening system according to the preferred embodiment of the present invention.
Figure 3:
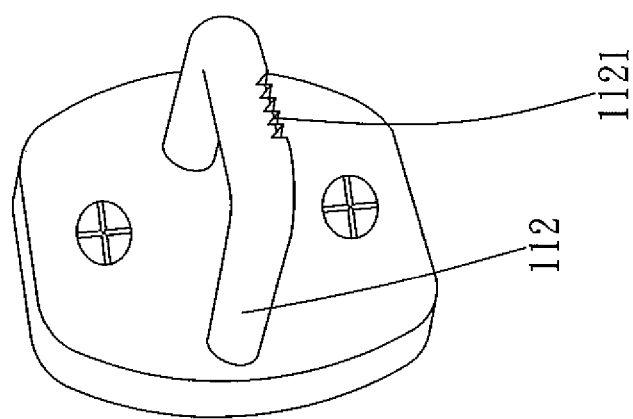

With reference to FIGS. 1-3, a safe opening system according to a preferred embodiment of the present invention being is mounted on an automobile 10.

The automobile 10 comprises a body 11, at least one automobile door 12, and a driving device 13.

The body 11 includes at least one peripheral frame 111, each of the at least one peripheral frame 111 has a locker 112 fixed thereon, and the locker 112 has a fixing groove 1121 formed thereon.

Each of the at least one automobile door 12 includes a front fringe 121 and a rear fringe 122 opposite to the front fringe 121 and facing a decoration plate 123 of the body 11, and the rear fringe 122 has an accommodation chamber 1221 in which a slot 1222 and a locking tongue 1223 are arranged, wherein the decoration plate 123 has a door bar 1231 disposed thereon and has an orifice 1232 defined adjacent to the rear fringe 122, such that the automobile door 12 is actuated to rotate along the body 11 so as to be opened or closed.

The driving device 13 includes an actuation sheet 131 and a spring 132, the actuation sheet 131 has a hook 1311 extending from a flat surface thereof, a connection stem 1312 perpendicular to the actuation sheet 131, a tab 1313 opposite to the hook 1311, and a rotary shaft 1314 inserted into the tab 1313. The spring 132 is fitted on the rotary shaft 1314, and the driving device 13 is accommodated in the accommodation chamber 1221, the actuation plate 131 is housed in the slot 1222 of each automobile door 12, wherein the connection stem 1312 is inserted into each automobile door 12 and a distal end of the connection stem 1312 is inserted through and partially extends out of the orifice 1232.

Figure 4:
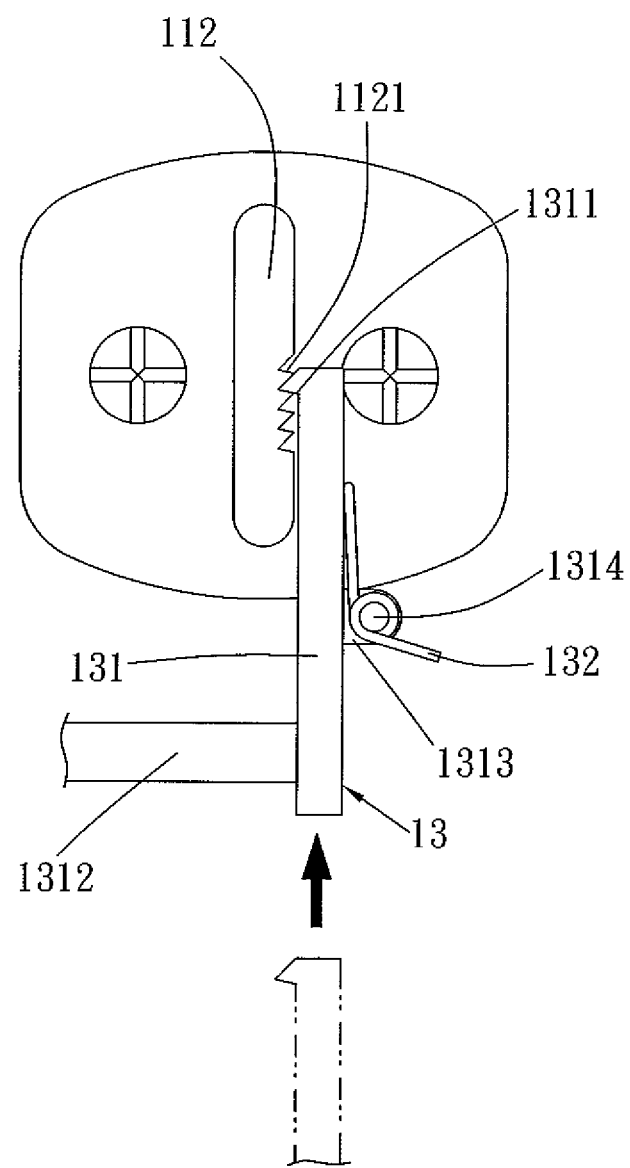
FIG. 4 is a side plan view showing the operation of a part of the safe opening system according to the preferred embodiment of the present invention.
Figure 5:
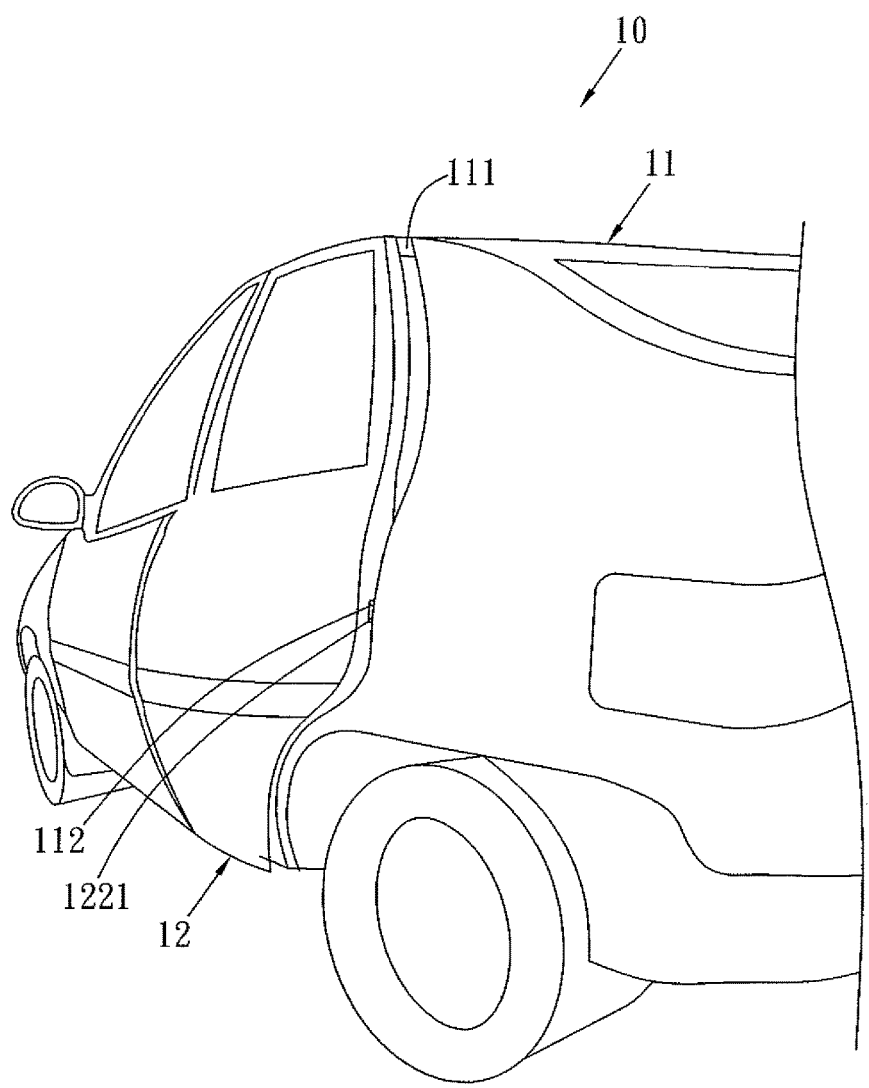
FIG. 5 is a perspective view showing the operation of the safe opening system according to the preferred embodiment of the present invention.
Figure 6:
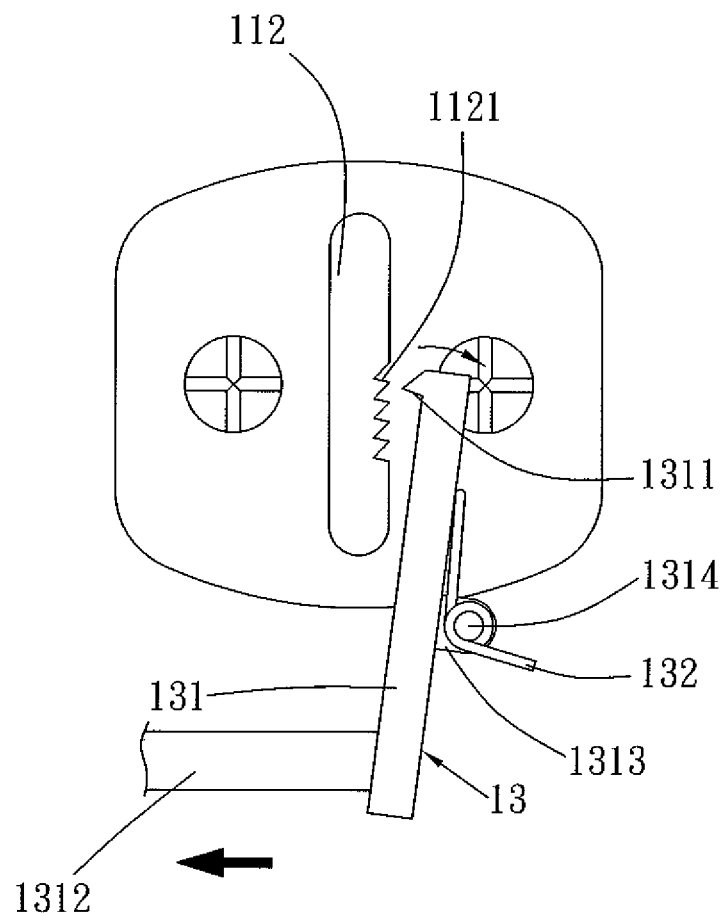
FIG. 6 is another side plan view showing the operation of a part of the safe opening system according to the preferred embodiment of the present invention.
Figure 7:
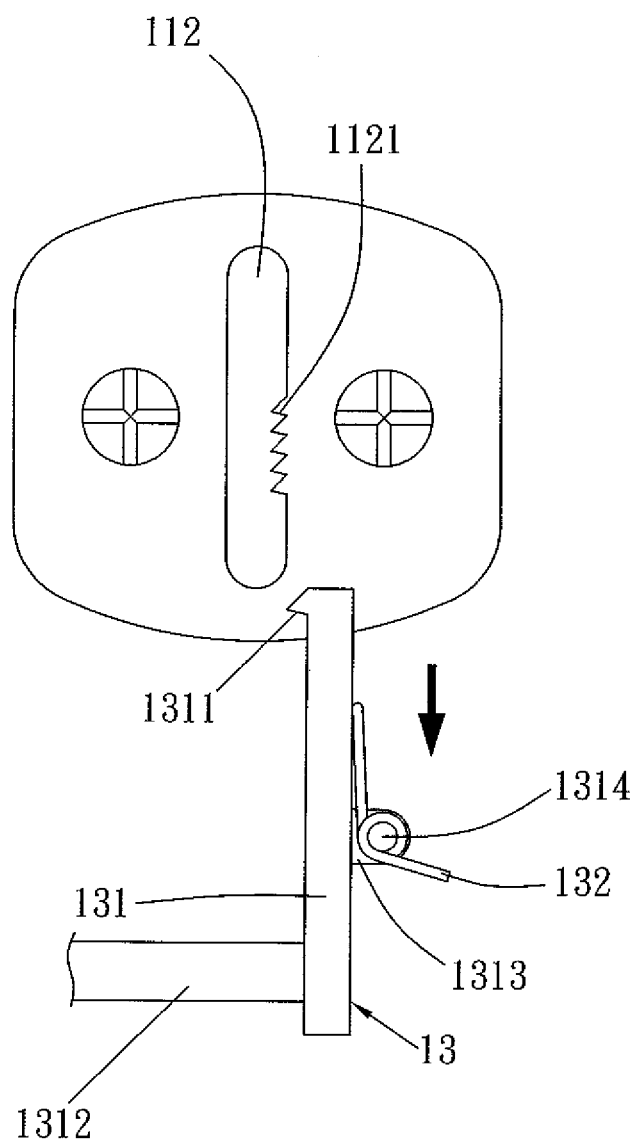
FIG. 7 is also another side plan view showing the operation of a part of the safe opening system according to the preferred embodiment of the present invention.
Figure 8:
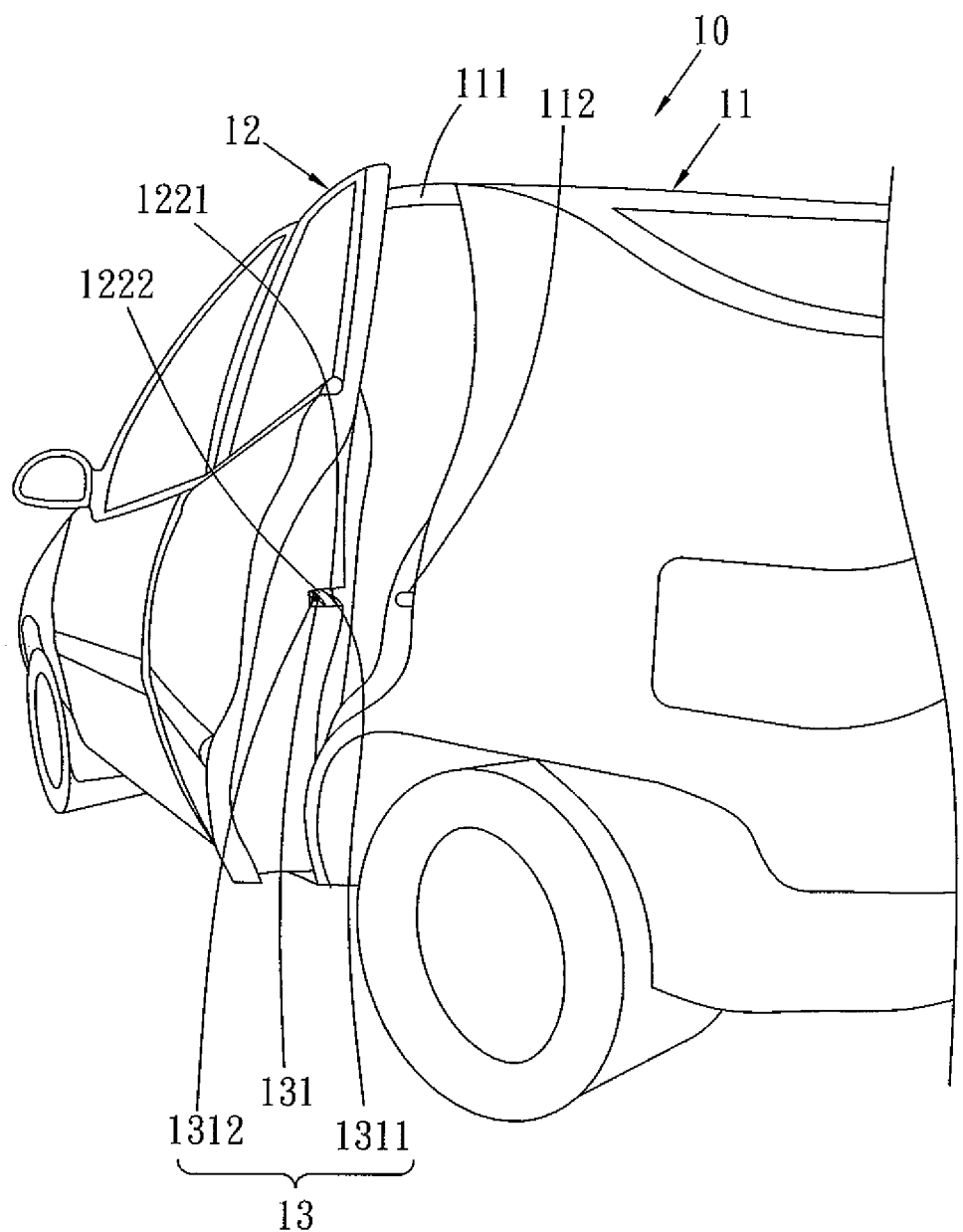
FIG. 8 is another perspective view showing the operation of the driving device according to the preferred embodiment of the present invention.

In use, after each automobile door 12 closes each peripheral frame 111 of the body 11, the front fringe 121 and the rear fringe 122 contact with each peripheral frame 111 so that the locker 112 of the body 11 is located in the accommodation chamber 1221 of each automobile door 12, the locking tongue 1223 inserts to the locker 112, the hook 1311 of the driving device 13 retains with the fixing groove 1121 of the locker 112. Referring to FIG. 4, when a driver or a passenger pulls the door bar 1231 of the decoration plate 123 and pushes each automobile door 12 outward, the hook 1311 of the driving device 13 retains with the fixing groove 1121 of the locker 112 so that a gap is defined between the body 11 and each automobile door 12 and is not expanded. As shown in FIG. 5, the driver or the passenger has to turn close to the orifice 1232 of the rear fringe 122 and to upward pull/downward press the distal end of the connection stem 1312 so that the connection stem 1312 drives the actuation sheet 131 in the slot 1222, and the rotary shaft 1314 rotates to actuate the hook 1311 to move downward/upward. As illustrated in FIG. 6, when the hook 1311 of the driving device 13 does not retain with the fixing groove 1121 of the locker 112, the body 11 and each automobile door 12 is opened completely. With reference to FIGS. 7 and 8, after the connection stem 131 is not pulled upward/pressed downward, the spring 132 pushes the actuation plate 131 to move back to an original position.

When the driver/the passenger pulls a door handle outside each automobile door, the door handle drives the connection lever 1312 to urge the hook 1311 to move downward/upward, thus opening each automobile door 12 outdoors in a first operation step.

The driving device is configured to open each automobile door in two operation steps for the driver/passenger, after the driver/passenger turns close to each automobile door, hence he/she notices whether there are automobiles/motorcycles/bicycles/passengers behind each automobile door. Preferably, the driving device is operated mechanically and does not contain any electronic parts so as to reduce failure rate. In case the automobile break down, out of power of battery or is turned off, supplying the power to the driving device 13 is not required, and the driving device 13 operates smoothly in the two operation steps so as to open each automobile door safely. In addition, the driving device is simplified so as to reduce fabrication and maintenance costs.

Accordingly, the safe opening system of the present invention has following advantages:

1. The driver/passenger has to turn close to each automobile door so as to pull/press the distal end of the connection stem 1312, and the connection stem 1312 drives the actuation plate 131 so that the rotary shaft 1314 rotates to actuate the hook 1311 to move downward/upward, and each automobile door 12 of the body 11 is opened completely, such that each automobile door 12 is opened in the two operation steps.

2. The driver/passenger has to turn close to each automobile door so as to upward pull/downward press the distal end of the connection stem, hence he/she notices whether there are the automobiles/motorcycles/bicycles/passengers behind each automobile door.

3. The driving device 13 is operated mechanically and does not contain any electronic parts so as to reduce the failure rate. In case the automobile break down, out of power of battery or is turned off, supplying the power to the driving device 13 is not required, and the driving device 13 operates smoothly in the two operation steps.

4. The driving device 13 is operated mechanically and is simplified so as to reduce the fabrication and maintenance costs.

5. The driving device 13 is operated mechanically and is simplified so as to reduce the failure rate.

While various embodiments in accordance with the present invention have been shown and described, it is clear to those skilled in the art that further embodiments may be made without departing from the scope of the present invention.

What is claimed is:

1. A safe opening system being mounted on an automobile, and the automobile comprising: a body, at least one automobile door, and a driving device;

the body including at least one peripheral frame, each of the at least one peripheral frame having a locker fixed on each peripheral frame, and the locker having a fixing groove formed on the locker;

each of the at least one automobile door including a front fringe and a rear fringe opposite to the front fringe and facing a decoration plate of the body, and the rear fringe having an accommodation chamber in which a slot and a locking tongue are arranged, wherein the decoration plate has a door bar disposed thereon and has an orifice defined adjacent to the rear fringe; and wherein the driving device includes an actuation sheet and a spring, the actuation sheet has a hook extending from a flat surface thereof, a connection stem perpendicular to the actuation sheet, and a rotary shaft, wherein the spring is fitted on the rotary shaft, and the driving device is accommodated in the accommodation chamber, the actuation plate is housed in the slot of each automobile door, wherein the connection stem is inserted into each automobile door and a distal end of the connection stem is inserted through and partially extends out of the orifice.

2. The safe opening system as claimed in claim 1, wherein the actuation sheet has a tab opposite to the hook, and the rotary shaft is inserted into the tab.

\* \* \* \* \*